May 18, 1948.   C. M. BRAINARD   2,441,749
ELECTRICALLY ENERGIZED VISIBLE UNIT
Filed Aug. 7, 1944
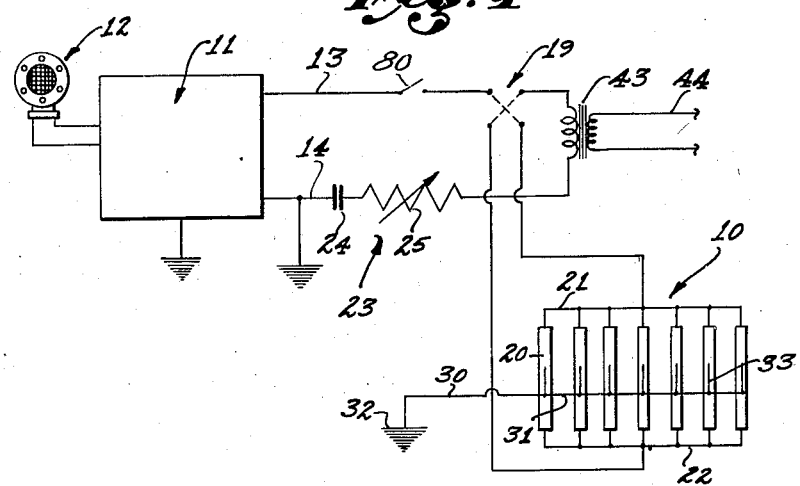
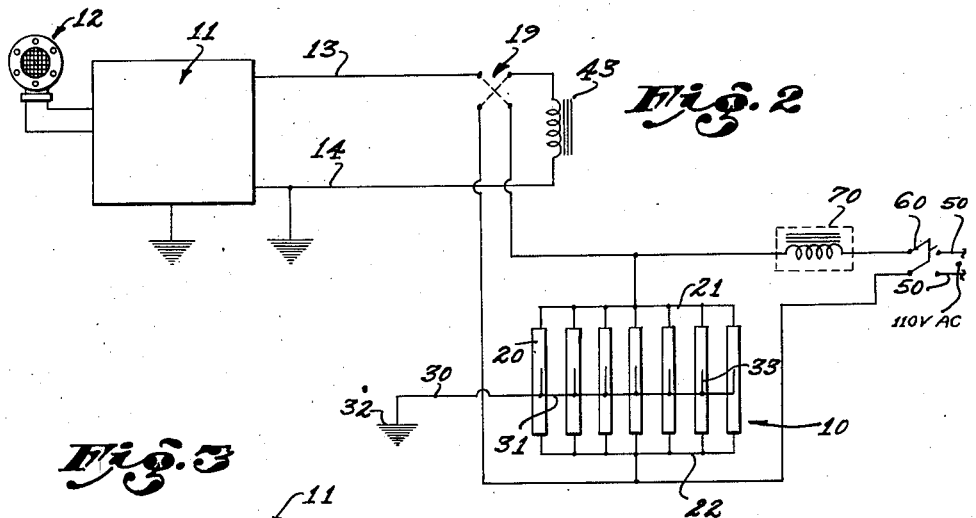
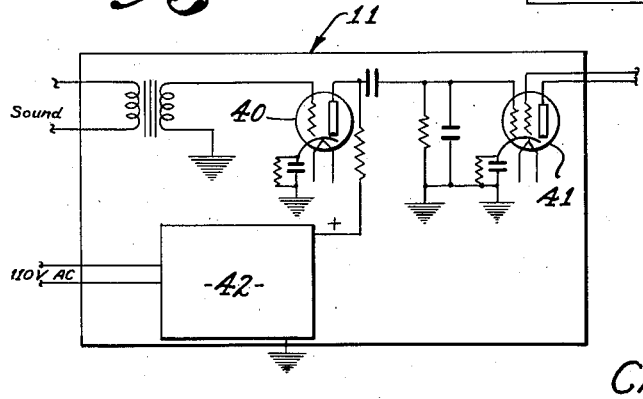
Inventor
CARL M. BRAINARD
By
Attorney Patented May 18, 1948

2,441,749

UNITED STATES PATENT OFFICE 2,441,749

ELECTRICALLY ENERGIZED VISIBLE UNIT

Carl M. Brainard, Los Angeles, Calif.

Application August 7, 1944, Serial No. 548,463

1 Claim. (Cl. 315—313)

This invention relates to an electrically energized visible unit and it is a general object of my invention to provide for the energization of a visible unit from or by means of an electric current whereby unique and heretofore unobtainable results are achieved.

The visible or visual unit energized through the present invention comprises one or more elements such as are commonly termed fluorescent tubes. The invention contemplates or provides for the energization of the visual unit by means of an electric circuit in which the characteristic of the current corresponds to sound waves, or the like. The invention further contemplates the initial lighting or energization of a visual unit through a circuit such as I have referred to and then the subsequent continuous energization of the unit by an ordinary power circuit such as the usual alternating current lighting circuit used for ordinary illumination.

A general object of the invention is to provide a visual unit of one or more fluorescent tubes and an electrical energizing circuit for the unit in which sound waves are transposed so that a unique and pleasing visual result is obtained at the visual unit. By the present invention the visual unit responds to qualities or factors of the sound such as tone, as well as volume, and as these factors of the sound vary the visual unit varies or responds, giving a visible interpretation of the sound.

It is another object of the invention to provide for the energization of a visible unit through a circuit in which the current is a transposition of sound and in which the unit, when once initially energized, can be maintained in a constant state of energization by means of the usual lighting circuit such as an ordinary 110 volt circuit which would not, ordinarily, be such as to establish the unit in an energized condition. By the present invention sound waves generated as by the voice of a person will energize the visual unit and, following such energization, a lighting circuit will serve to maintain the unit in a constantly energized condition.

The various objects and features of my invention will be fully understood from the following detailed description of typical preferred forms and applications of the invention, throughout which description reference is made to the accompanying drawings, in which:

Fig. 1 is a diagrammatic view of a typical, simple circuit embodying the invention, the circuit shown in this figure being one which serves to transpose sound waves into electrical energy which, in turn, energizes a visual unit. Fig. 2 is a view similar to Fig. 1 in which an alternating current circuit is included to constantly energize the visual unit upon it being initially energized through the circuit responsive to sound, and Fig. 3 is a diagram of a typical amplifying circuit such as may be employed in carrying out the invention.

The apparatus of the present invention in its broader or more generic form involves what I will term a visual unit 10 and an electrical unit 11 which is connected to the unit 10 and which serves to pick up sound waves and transpose them into electrical impulses or to impose them upon an electric current which is such as to energize the unit 10.

Referring, in particular, to the form of the invention shown in Fig. 1 of the drawings the electrical unit 11 includes a sound pick-up device such as a microphone 12. The unit 11 serves primarily to take the feeble or weak electrical impulses from the circuit in which the microphone 12 is connected and amplify them through suitable stages of amplification so that the current in the circuit carried by the leads 13 and 14 from the unit 11 corresponds to the sound waves picked up by the diaphragm in a suitably amplified form. In the circuit illustrated the lead 13 carries the positive or plate side of the circuit from the unit 11 while the lead 14 carries the ground side of the circuit.

The visual unit 10 includes one or more gas filled tubes 20. In the usual case there will be a bank of a number of tubes 20 and the tubes will be connected between what I will term bus bars 21 and 22, or in other words, they will be connected to form a bank of tubes in parallel with each other. The individual tubes may, in practice, vary in size and character or type. However, I prefer, in most instances, to use tubes uniform as to size and shape. For pleasing visual results I may employ gas filled tubes that vary in character, for instance, as to color. In carrying out the invention I can use any suitable gas or tube such as will function in devices such as are known commercially as fluorescent tubes. As an example, neon or argon gas can be used to advantage.

The leads 13 and 14 carrying the circuit from the electrical unit 11 extend to the unit 10, so that the bank of tubes of the unit 10 is connected in this circuit. The invention provides in its preferred arrangement, a reversing switch 19 in the circuit between the units 10 and 11 so that the polarity of the bus bars 21 and 22 of the unit 10 can be reversed relative to that of the unit 11 as circumstances may require. Further, the invention provides, in the form shown in Fig. 1, what I will term a brilliance control 23 which serves to control the energization of the unit 10. The brilliance control for the best sensitivity is located in the ground lead 14 of the circuit between the unit 11 and the reversing switch 19. The control 23 is such as to vary the resistance of the circuit. In practice I find it practical and advantageous to form the control 23 by connecting a condenser 24 and a variable resistor or rheostat 25 in series in the lead 14 between the switch 19 and the unit 11 or ground.

In the preferred form of the invention I provide priming means 30 which may include a conductor 31 arranged across the bank of tubes be-the other, and with variations in sound input the tween their ends, which conductor has a suitable ground connection 32. I have found that it is advantageous to locate the conductor a short distance from the end of the bank connected to the plate side, through lead 14 and in some instances I provide extensions 33 of the conductor 31 to more closely approach the other end of the tubes that may be weak.

The electrical unit 11 is primarily an amplifying unit. For purpose of example I have shown a circuit that may be employed. This circuit as shown in Fig. 3, involves, primarily, two stages of amplification, a first stage at 40 effected by means of a triode or pentode tube, and a second stage at 41 effected by a suitable tube such as a pentode tube, as illustrated. Any suitable or standard power supply unit 42 may be employed, as shown in the diagram. In order to make the output current from the unit 11 correspond in character or be a translation of the sound picked up by the microphone I provide a choke 43 which establishes a variable load across the output tube. In cases where it is desired to operate a speaker in synchronism with the visual unit 10 I may provide an output transformer in place of a choke, in which case leads 44 may extend to the voice coil of a speaker unit.

In the operation of the unit that I have illustrated in Fig. 1 sound waves picked up by the microphone 12 are translated into an electric current and by reason of the amplifying means in the unit 11 the current from the microphone corresponding to the sound waves is greatly amplified. Assuming the switch 19 to be set so that the bus bar 21 of the unit 10 is connected to the positive side or lead 13 of the circuit from unit 11, the resistance means 23 which is, in effect, a brilliance control, is operated or adjusted to a position where the unit 10 is energized. By energization of the unit 10 I means that the gas of one or more of the tubes 20 becomes excited so the tubes become luminous. The result that I actually obtain when employing a bank of tubes 20 such as I have shown in the diagram is that one or possibly a few of the tubes will be initially energized and their brilliance or degree of energization will vary responsive to the variations in tone or volume of the sound put in at the microphone 12. As variations occur in the sound input either as to volume or tone, or both, additional tubes may become energized or some previously energized tubes may drop out, with the result that there is a visual phenomena set up in the unit 11 which corresponds to or is a translation of the sound put in at the microphone 12. I have found, in practice, that the apparatus follows no particular or fixed pattern, but rather under what is seemingly one certain sound condition repeated at different times, somewhat different visual effects will be obtained in the unit 10, for instance, under what appears to be one sound condition, I may get energization of one or two tubes in the unit 10, whereas on another occasion, with seemingly the same sound input, I may get different tubes energized and maybe a different number of tubes energized. Further, by regulating the brilliance control 23 I can adjust the circuit so that the tubes, upon being energized, become fully energized instantaneously or so that the energization progresses in the tubes from the positive or plate side of the circuit toward the ground side, or in other words, from one end of the tubes to extent of illumination in the tubes may vary.

In the form of the invention shown in Fig. 2 of the drawings I show a simple circuit in which the electrical unit 11 is intended primarily to initiate energization of the visual unit 10 while a circuit carried by what I will term power lines 50, under control of a switch 60, is provided to carry on or maintain the energization of the unit 10. In this form of the invention I do not need a brilliance control 23 and consequently the condenser 24 and rheostat 25 can be eliminated, the circuit simply being made such that upon sound being picked up by the microphone 12 the tubes of the means 10 are energized. When the tubes have thus been initially energized the circuit carried by the power lines 50 which are connected to the bus bars 21 and 22 of the unit 10, will maintain the energization making further actuation from the unit 11 unnecessary. In practice, the switch 60 controlling the power lines is closed so that the bus bars 21 and 22 are established with the necessary potential to pick up the energization of the tubes once that has been effected through the means 11. Immediately after switch 60 is closed switch 80 controlling means 11 is opened.

In carrying out the form of the invention just described a ballast transformer 70 is connected in the power circuit to the unit 10, for instance, in one of the power lines 50. I have found that when such a circuit is used I can employ fluorescent tubes 20 in the unit 10 which are ordinarily termed dead, that is, which are such that they will not function with ordinary circuits employed for energizing fluorescent tubes.

Having described only typical, preferred forms and applications of my invention, I do not wish to be limited or restricted to the specific details herein set forth, but wish to reserve to myself any variations or modifications that may appear to those skilled in the art and fall within the scope of the following claim.

Having described my invention, I claim:

In a system of the character described, a microphone, a single amplifier for the electrical impulses from the microphone, and a multiplicity of gas filled tubes connected in parallel and excited by amplified audiofrequency from the amplifier, the tubes being of different sensitivity.

CARL M. BRAINARD.

REFERENCES CITED

The following references are of record in the file of this patent:

UNITED STATES PATENTS

| Number | Country | Date |
| --- | --- | --- |
| 1,041,210 | Weintraub | Oct. 15, 1912 |
| 1,221,034 | de Forest (a) | Apr. 3, 1917 |
| 1,365,157 | de Forest (b) | Jan. 11, 1921 |
| 1,446,247 | de Forest (c) | Feb. 20, 1923 |
| 1,654,068 | Blattner | Dec. 27, 1927 |
| 1,690,279 | Craft | Nov. 6, 1928 |
| 1,729,091 | Atherton | Sept. 24, 1929 |
| 1,908,191 | Schriever | May 9, 1933 |
| 1,961,749 | Ewest | June 5, 1934 |
| 2,146,818 | Hahnle | Feb. 14, 1939 |
| 2,173,234 | Linder | Sept. 19, 1939 |
| 2,339,178 | Lemmers | Jan. 11, 1944 |

FOREIGN PATENTS

| Number | Country | Date |
| --- | --- | --- |
| 214,754 | Great Britain | May 1, 1924 |
| 435,025 | Great Britain | Sept. 13, 1935 |